United States Patent [19]

Greco

[11] Patent Number: 5,795,952
[45] Date of Patent: Aug. 18, 1998

[54] TWO-STAGE PROCESS FOR THE PREPARATION OF POLYCARBONATE COPOLYETHER DIOLS

[75] Inventor: Alberto Greco, Milan, Italy

[73] Assignee: Enichem S.p.A., Milan, Italy

[21] Appl. No.: 818,939

[22] Filed: Mar. 17, 1997

[30] Foreign Application Priority Data

Mar. 28, 1996 [IT] Italy .................... MI96A0615

[51] Int. Cl.$^6$ .................................................. C08G 64/00
[52] U.S. Cl. .................... 528/196; 528/176; 528/190; 528/193; 528/194; 528/198
[58] Field of Search ........................ 528/176, 190, 528/193, 194, 196, 198

[56] References Cited

U.S. PATENT DOCUMENTS

| | | | |
|---|---|---|---|
| 4,518,766 | 5/1985 | Greco et al. | 528/370 |
| 4,990,578 | 2/1991 | Greco et al. | 528/456 |
| 5,116,929 | 5/1992 | Greco et al. | 528/44 |
| 5,288,839 | 2/1994 | Greco | 528/204 |

Primary Examiner—Terressa Mosely
Attorney, Agent, or Firm—Oblon, Spivak, McClelland, Maier & Neustadt, P.C.

[57] ABSTRACT

A process for the preparation of polycarbonate copolyether diols comprising two successive reaction stages wherein in the first stage the precursor, bisdimethylcarbonate of polyether diols is synthesized by reacting, in a reactor equipped with a distillation column, one or more polyetherglycols with dimethyl carbonate, in the presence of a basic catalyst selected from the group consisting of an oxide, a hydroxide, a carbonate and an alcoholate of a metal belonging to the group of alkaline or earth-alkaline metals and in the second stage, the precursor, after being freed from the catalyst and excess dimethylcarbonate, is converted to polycarbonate copolyether diols by transesterification reaction with polyetherglycols in the presence of a solvent and an organometallic catalyst selected from compounds of tin, lead, titanium, zirconium and antimonium, said polycarbonate polyether diols having utility as additives in the field of polyurethane end-products, thermoelastomers, paints and adhesives.

11 Claims, No Drawings

TWO-STAGE PROCESS FOR THE PREPARATION OF POLYCARBONATE COPOLYETHER DIOLS

The present invention relates to a process for the preparation of polycarbonate copolyether diols.

More specifically, it relates to a process for the preparation of polycarbonate copolyether diols (PEG CD) comprising two successive reaction stages in which in the first stage the precursor, bisdimethylcarbonate of polyether diols (MC PEG C) is synthesized and in the second stage the precursor is converted to polycarbonate copolyether diols (PEG CD).

The invention also relates to the polycarbonate polyether diols obtained by the above process.

Polycarbonate polyether diols can be usefully applied as additives in the field of polyurethane end-products, thermoelastomers, paints and adhesives.

A variety of syntheses for the preparation of PEG CD are known in the art.

One method, for example, comprises the condensation of PEG with phosgene in the presence of substances capable of subtracting hydrochloric acid.

This synthetic method however, involves a chemical reagent, phosgene, which can only be synthesized and used in appropriate industrial areas and, in addition, produces vast quantities of inorganic waste products (NaCl, $CaCl_2$) in the form of aqueous solutions, which must be disposed of.

Another method enables PEG CD to be obtained by the addition of carbon dioxide to cyclic ethers, such as ethylene and propylene oxide, in the presence of glycol as polymerization initiator (EP 220453; R. H. Harris, J. Appl. Polym. Sc. 44, 605 (1992); J. Appl. Polym. Sc. 41,1907, (1990); WO 8700185; U.S. Pat. No. 4,816,529; U.S. Pat. No. 4,295,810).

This synthesis method, although having the advantage of using low cost raw materials, does not allow the preparation of PEG CD with a controlled molecular weight and provides only structures deriving from polyethylene and polypropyleneglycol. In addition, it requires large quantities of catalyst whose elimination from high viscosity products considerably complicates the process, as disclosed for example in U.S. Pat. No. 4,528,364. Finally it necessitates the use of temperatures of between 180° and 210° are used to perfect the extraction of the lighter polyether glycol from the reaction medium by distillation under vacuum; in this temperature range, polyether polycarbonates, particularly in the presence of catalysts, are not thermally stable.

The thermal decomposition also tends to increase the level of unsaturation present in the product and makes it difficult to minimize the colour and causes the formation of by-products.

Another method for obtaining PEG CD is to react in the presence of suitable catalysts, among which for example the sodium stannate mentioned above, cyclic carbonates of ethylene glycols or polypropyleneglycols with smaller proportions of glycol used as polymerization initiator (Polymer 33, 13, 2807, 1992; U.S. Pat. No. 4,105,641).

This system however has the same limitations as the previous process and also requires the availability of ethylene and/or propylene carbonate, generally obtained by the addition of carbon dioxide to the corresponding epoxides.

A further way of producing PEG CD is the transesterification of PEG with dialkyl, diaryl, diallyl or alkylene carbonates.

The transesterification process has some advantages with respect to the previous method; in particular it enables the synthesis of all possible structures, the use of limited quantities of catalyst and the programming of the molecular weight (Mn) on the basis of the stoichiometric value of PEG/dialkyl, diaryl, dialkylcarbonate or alkylene carbonate. Reagents however, such as diethylcarbonate and ethylene carbonate which seem particularly appropriate for this type of reaction are extremely costly (U.S. Pat. No. 4,476,273) and do not guarantee molecular weights with sufficient accuracy over the limit of 1500 units on the sole basis of the stoichiometric value; this limitation therefore leads to the necessity, for controlling the MW, of extracting the glycol by distillation under vacuum as mentioned above.

We have now found a process for the preparation of polycarbonate copolyether diols (PEG CD) comprising two successive reaction stages, which overcomes the disadvantages of the known art.

More specifically, the present invention relates to a process for the preparation of polycarbonate copolyether diols (PEG CD) having formula (I):

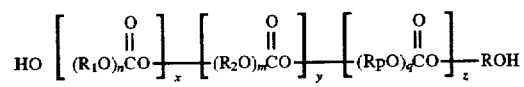

wherein $R_1, R_2 \ldots Rp$ the same or different are divalent organic radicals and correspond to the following structures:

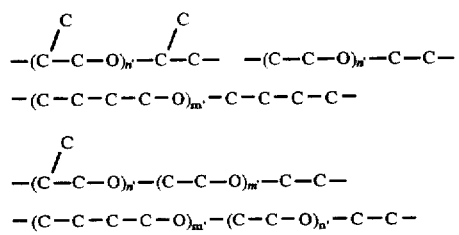

wherein n' and m' are numbers also fractions between 1 and 10; n, m and q can have any value between 1 and 10; in the general formula x, y and z either individually or as a sum can have any value between 1 and 40, said process comprises:

a first reaction stage in which the precursors bisdimethylcarbonates of polyetherglycol polycarbonates (MC PEG C) having the formula:

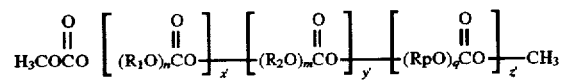

wherein $R_1, R_2 \ldots Rp$, the same or different, are divalent organic radicals and have the meaning previously defined; n, m and q can have any value between 1 and 10; x', y' ... z', alone or as a sum, can have any value between 1 and 10, are prepared by reacting, in a reactor equipped with a distillation column, one or more polyetherglycols (PEG) having the formula:

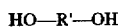

HO—R'—OH wherein R' is a divalent organic radical corresponding to one of the following structures:

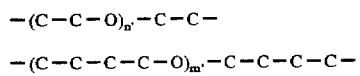

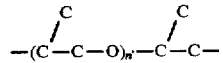

-continued

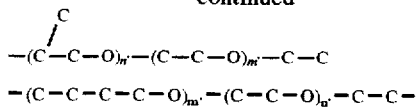

wherein m' and n' have the meaning defined above, with dimethyl carbonate (DMC), at a temperature of between 90° and 120° C., in a molar ratio DMC/PEG of between 2 and 12 and in the presence of a basic catalyst selected from the group consisting of an oxide, a hydroxide, a carbonate or an alcoholate of a metal belonging to the group of alkaline or earth-alkaline metals at a concentration of between 0.001 and 0.1% by weight, a second reaction stage in which the precursor, bismethylcarbonate of polyetherglycol polycarbonates (MC PEG C), after being freed from the catalyst and excess dimethyl carbonate (DMC), is converted to polycarbonate copolyether diols by transesterification reaction with polyetherglycols (PEG), having formula HO—R"—OH, wherein R" is a mixture or one of the following structures:

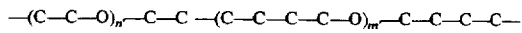

in a reactor equipped with a distillation column, at a temperature of between 140° and 185° C., at atmospheric pressure, in a ratio between bisdimethylcarbonate of polyetherglycol polycarbonates (MC PEG C) and polyetherglycols (PEG) of between 0.8 and 2, in the presence of a solvent and an organometallic catalyst selected from compounds of tin, lead, titanium, zirconium, and antimonium at a concentration of between 0.0001–0.0010% by weight.

The process of the present invention, with respect to the prior art, has the following advantages:

possibility of preparing all possible structures on the basis of the general formula.

possibility of accurately controlling the molecular weight within the range 500–5000, on the basis of the stoichiometric values of the reagents (ratio between the precursor and PEG).

use of very low levels of catalyst (0.0001–0.0010% by weight) in the second reaction stage, which minimizes or makes its elimination superfluous.

preparation of products with excellent characteristics such as, for example, low colouring and high hydroxylic functionality.

use of DMC as transesterification agent instead of other more costly carbonates.

minimization or absence of by-products, both light such as dioxane and heavy such as large-ringed cyclic carbonates.

use of more moderate process conditions. For example, low temperatures in the synthesis of the precursor (120° C.) and in the synthesis of the product (150° C.); no necessity for high vacuums to remove the lighter solvents (polyether glycols) from the reaction medium.

The bisdimethylcarbonates of polyetherglycol polycarbonates (MC PEG C) are prepared by reacting, in a reactor with an overlying rectification column, at a temperature of between 90° and 120° C., one or more polyetherglycols (PEG) with DMC, in a molar ratio DMC/PEG of between 2 and 12, in the presence of an alkaline catalyst at a concentration of between 0.001 and 0.1% by weight.

The reaction is represented by the following scheme (2):

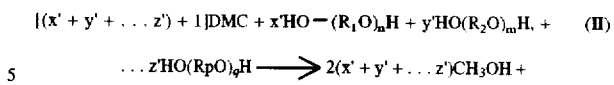

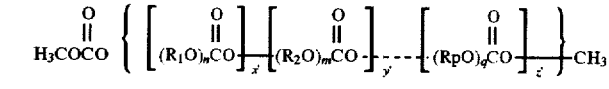

The catalysts which can be used are for example, lithium and potassium carbonate, potassium alcoholate, barium oxide, calcium oxide, sodium hydroxide, potassium hydroxide, sodium hydroxide (sodium methylate) being the preferred catalyst.

The following products are conveniently used in the reaction: diethyleneglycol (DEG), triethyleneglycol (TEG), tetraethyleneglycol (EG4), polyethyleneglycol Mn 200 (PEG 200), dipropyleneglycol (DPG, mixture of isomers), tripropyleneglycol (TPG, mixture of isomers), polypropyleneglcyol Mn 400 (PPG 400), polypropyleneglycol Mn 450 (PPG 450), polypropyleneglycol Mn 650 (PPG 650), polytetrahydrofuran Mn 250 (PTMEG 250), polytetrahydrofuran Mn 600 (PTMEG 600), dipropyleneglycol polyethyleneglycol Mn 250 (DPG bEO 250).

During the transesterification reaction the azeotropic mixture DMC/methanol is removed from the reaction environment so that in most cases the reaction temperature tends to exceed the preset limit of 120° C.; in this case further DMC is added to the reactor to bring the temperature back to the above-established limits.

The transesterification reaction which converts the PEG to MC PEG C (II) requires from 6 to 24 hours for its completion which is marked by the almost total absence of methanol from the distillate at the head of the column; this means that pure DMC passes to the head of the column (b.p. 87°–89° C. against m.p. 62°–63° C. at 760 mm of the azeotropic mixture $CH_3OH/DMC$, 65% by weight of $CH_3OH$).

When the reaction is complete, the MC PEG C (II) is obtained in the form of a solution, with a more or less intense yellow colour and containing catalytic residues in the excess DMC (30–70% by weight). The catalyst is removed from this low viscosity solution which is completely decoloured by passage over bleaching earth preferably at a temperature of between 20° and 90° C. This treatment can be carried out in the reactor by suspending the bleaching earth (0.5–5% by weight) or, preferably, by circulating the solution in towers filled with the earth until total elimination of the alkaline ion (sodium in the case of NaMet).

Other treatment or methods are obviously also valid provided the catalyst is removed or its presence limited to a quantity of <3 ppm.

For this purpose the bleaching earth can be substituted with other chemical adsorbants, such as active carbon, synthetic acid resins (Ampberlist H), or an aqueous washing can alternatively by carried out.

After the elimination treatment of the catalyst, compound II is recovered from the DMC by distilling the latter under vacuum at 20–50 mm Hg, at a temperature of 120°/140° C.

Compound II with a colour of less than 50 APHA, is characterized with respect to the molecular weight via spectroscopy ($^1H$ and $^{13}C$ nmr), via gel permeation chromatography (gpc) and vapour phase osmometry (vpo). (ii) Preparation of the PEG CD.

The MC PEG C (II) isolated as described above are transesterified with PEG having structure (I) to give PEG CD (III), according to the following scheme (1):

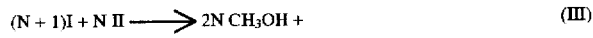

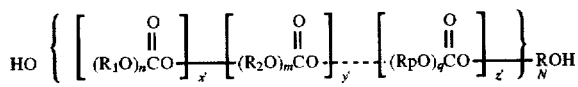

As x=x'N, y=y'N ... z=z'N.

The reaction is carried out in a reactor identical to that described for the preparation of compound II. The reactor is charged with compounds I and II in quantities which are empirically established to reach the desired Mw (Mn) of the PEG CD (III), a solvent which is preferably toluene, capable of facilitating the removal of the methanol which is formed in the reaction (see scheme 1) and finally an appropriate catalyst. The reaction of scheme 1 is preferably carried out at atmospheric pressure with a sufficient quantity of solvent to maintain a vigorous reflux in the column and with a temperature inside the reactor of between 140° and 185° C., preferably 150°–155° C.

The catalyst used consists of an organometallic compound. Among these titanium tetraalcoholates and tetraphenates such as titanium tetraisopropoxide, titanium tetrapropoxide, titanium tetrachloride, zirconium alcoholates such as zirconium tetrabutylate, magnesium hexabutane titanate, di and tetravalent compounds of tin, such as stannous octoate, dibutyl tin oxide, dibutyl tin dilaurate, antimonium oxide, lead octoate and lead stearate, can be mentioned. Titanium is preferred in the form of alkoxide, such as titanium tetraisopropylate or titanium tetrabutoxide, at a concentration of between 0.0005–0.001% by weight as $Ti^{+4}$ ion.

The ratio between PEG (I) and MC PEG C is generally empirically established on the basis of the MW to be reached; this ratio can vary from the expected value on the basis of the scheme of reaction 1, as the transesterification process causes a secondary reaction which leads to the formation of DMC by the coupling of two MC PEG C (II) tails; the higher the MW (Mn) to be reached, the more competitive this reaction becomes with the reaction which causes the elimination of methanol.

It is not difficult however to settle this ratio after a few attempts, which in the MW (Mn) varying from 500 to 3000, is between 2 and 0.8.

The transesterification reaction of scheme 1, carried out at atmospheric pressure, requires for the levels of catalyst indicated, from six to 24 hours for its completion, within a temperature range of 150°–170° C.

The reaction is considered complete when pure toluene is obtained at the head of the rectification column, with bp 109+10° C., at 760 mm Hg, against bp 63° C. of the azeotropic mixture methanol toluene.

No other product apart from those indicated can be observed in the organic waste at the head of the column, indicating that demolition reactions are absent or limited, even when the PEG is a polyethyleneglycol.

When the reaction is complete, the toluene in which the PEG CD is only partially soluble, is removed by distillation at reduced pressure (15–20 mm at 120°–140° C.) and the PEG CD (III) is recovered in more or less viscous liquid form, regardless of its structure and its MW (Mn), still containing the catalyst which must be neutralized.

For this purpose a hydrothermal treatment can be used or an agent capable of capturing the metal ions.

The hydrothermal treatment is generally carried out by adding water (0.5–5% of PEG CD) at the end of the reaction and vigorously mixing the emulsion thus obtained within a temperature range of 50° and 120° C., for several hours.

At the end of the treatment the water is eliminated under vacuum at 10–30 mm Hg at 100°–140° C.

As an alternative to the hydrothermal treatment, ion-capturing chemical agents can be used, in particular organic acids such as salicylic acid, oxalic acid, tartaric acid, gallic acid, polyphenols such as pyrogallic acid or mineral acids such as phosphoric and polyphosphoric acid.

The ratio between capturing agent and the titanium ion is generally between 0.5 and 5.

The PEG CD, after the treatment, are ready to be used directly in the synthesis of polyurethanes as they have all the characteristics necessary for satisfying the requirements for these products, in particular:

high degree of hydroxylic functionality (>99% of the theoretical value)

good colour controlled reactivity towards isocyanates.

The following examples are illustrative but should not be considered as limiting the present invention.

For the characterization of the products, the following methods were applied:

| | |
|---|---|
| $N°_{OH}$ analysis (Method B) | ASTM D 2849 |
| unsaturations (Mercury acetate method) | ASTM D 2849 |
| alkalinity | ASTM D 2849 |
| K and Na | ASTM D 2849 |

(Spectrophotometric method)
—$H^1$ and $C^{13}$ nmr
(in $CDCl_3$, solutions at 20% of I or III Brucker 400 Mhz apparatus)

EXAMPLE 1

Preparation of MC PEG C from mixtures of DEG and PEG 200 (IIa).

750 g of PEG 200 (3.80 moles; $N°_{OH}$ 568.1, Mn 197.5), 250 g of DEG (2.36 moles) and 1589 g of DMC (17.65 moles; R DMC/PEG=2.87) are charged into a 3 l four-necked flask equipped with a stirrer, thermometer, inlet tube for the nitrogen and with an overlying rectification column packed with Fensche rings of 1 meter in length and 2.5 cm in diameter.

The solution is brought to reflux with a heating oil-bath and 30 ml opf DMC are removed from the head of the column to eliminate any possible water present.

0.3 ml of sodium methoxide at 30% by weight in methanol are then added, 0.0016% as $Na^+$ as catalyst.

Methanol is immediately formed and is removed in the form of an azeotropic mixture (bp 63° C.) at the head of the column. The transesterification is continued until the internal temperature has reached 120° C., which requires about 12 hours.

At the end of this time the azeotropic mixture collected (65% of methanol) forms the main fraction of the distillate (639 g), a second intermediate fraction (bp 63°–89° C.) prevalently contains DMC and to a lesser degree methanol (78 g).

The temperature is lowered to 80° C. and the solution of IIa in DMC is circulated in a column of 0.5 m in length and 5 cm in diameter filled with bleaching earth (Tonsil, pH 3.5) until the $Na^+$ content is <1 ppm and the colour is <30 APHA.

The solution of IIa is then transferred to the flask and the DMC (400 g) recovered by distillation under reduced vacuum (65 mm Hg) at a boiler temperature of 140° C.

The compound IIa (1446 g) is in the form of an oily liquid with the following characteristics:

| colour (APHA) | 25–30 |
|---|---|
| Mn (based on $^1$H and $C^{13}$ nmr) | 509 |
| N°$_{OH}$ (mg KOH/g) | 0.6 |
| viscosity (Cps, +25° C.) | 680 |

Structure formula:

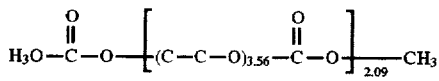

wherein the index n=3.56 is the average of the ethylene sequences which can be obtained considering the molar fractions of the two polyetherglycols used. i.e. the DEG and PEG 200. obtained from:

$$n=[0.75\times(197.5-18)+0.25\times(106-18)]/44$$

EXAMPLE 2

Preparation of PEG CD from MC PEG C (IIa, ex. 1) and DEG (Ia).

The same reactor is used as in example 1, substituting the flask with one having a capacity of 1 l. 140 g of IIa (0.275 moles), 37 g of DEG (0.349 moles; R DEG/IIa=1.269) and 60 ml of toluene are charged into the flask.

The temperature is raised by external heating to 150°–152° C. to maintain an efficient reflux at the head of the rectification column.

At this point the catalyst (0.1 ml of titanium isopropylate (TIPA) 30% by weight in isopropanol, equal to 30 ppm of titanium ion) is added with a syringe.

In about 2 hours the temperature registered at the head of the column is exactly the same as the azeotropic mixture toluene-methanol (62°–63° C. at 760 mm Hg); slow sampling is then initiated (12 hours about) until the temperature registered at the head of the column is exactly the same as pure toluene (bp 109°–110° C. at 760 mm Hg).

During the test it is necessary to integrate part of the toluene lost during the rectification (40 g) to maintain the reaction temperature at the level indicated.

The distillate (bp varying from 62° to 109°/110° C.; 87.8 g) mostly consists of toluene (75.8% by weight) and methanol (19.1%) with a smaller proportion of DMC (5.1% by weight).

The product IIIa is recovered from the emulsion in toluene by distillation of the latter under reduced vacuum (50 mm Hg) at 140° C.

155 g of PEG CD (IIIa) are obtained with the following characteristics:

| colour (APHA) | light yellow |
|---|---|
| Mn (based on N°$_{OH}$) | 1783 |
| N°$_{OH}$ (mg KOH/g) | 62.9 |
| viscosity (Cps, +25° C.) | 10000 |
| unsaturations (meq/g) | 0.00075 |
| tg (DSC; C.°) | −41 |

Structure formula:

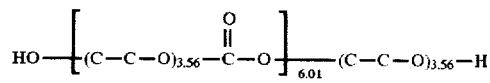

and content of $CO_3$ equal to 27% by weight. No presence of dioxane or other by-products are observed in the distillate.

The protons corresponding to the methylcarbonate chain-ends (3.75 ppm, single) cannot be determined at the $^1$H spectrum.

EXAMPLE 3

Preparation of MC PEG C (IIb) from polytetramethyleneglycol with Mn 250 (PTMEG 250).

1230 g (5.039 moles) of PTMEG 250 (N°$_{OH}$ 459.8; Mn 244.1), 1500 g (16.6 moles) of DMC and 0.12 ml of NaMet (30% by weight in methanol, 0.0006% by weight as Na$^+$ ion) are reacted in the same equipment described in example 1.

The internal temperature is brought to 90° C. by heating with an oil-bath to maintain an efficient reflux in the column and in about 14 hours the azeotropic mixture methanol-DMC is collected first and then pure DMC when the reaction is complete (bp 87°–89° C. or 760 mm Hg).

During the 14 hours of reaction the temperature inside the reactor rises to +120° C. and it is necessary to integrate the DMC lost in the distillation with a further aliquot of DMC (g 350, 3.89 moles; ratio DMC/PTMEG 250=4.07).

The distillate when the reaction is complete (538 g) consists exclusively of DMC and methanol.

The solution of IIb is then first treated with bleaching earth (tonsil, pH 3.5; 12 g, 0.5% by weight) for 4 hours at 80° C. under vigorous stirring and subsequently filtered on a septum in synthetized glass.

The DMC is removed by distillation under reduced vacuum (130°–140° C., 80 mm Hg) obtaining 1656 g of IIb in the form of a moderately viscous liquid, with the following characteristics:

| colour | practically colourless |
|---|---|
| Mn (on basis of $^1$H and $C^{13}$ nmr) | 532 |
| N°$_{OH}$ (mg KOH/g) | 0.37 |
| viscosity (Cps, +25° C.) | 45.3 |
| structure formula | |

$$H_3CO-\overset{O}{\overset{\|}{C}}-O\left[(C-C-C-C-O)_{3.53}CO\right]_{.54}CH_2 \quad (IIb)$$

EXAMPLE 4

Preparation of PEG CD (IIIb) by reaction of MC PEG C (IIb) and PTMEG 250 (Ib).

The following products are charged into the same reactor described in example 1: 300 g (0.564 moles) of MC PEG C (ex. 3, IIb), 217 g (0.889 moles) of PTMEG 250, 80 ml of toluene and 0.1 g of titaniumtetraisopropylate (35 ppm as titanium ion). The ratio Ib/IIb=1.576.

The internal temperature is brought to a range of between 155° and 160° C. During the reaction, which requires a time of from 10 to 12 hours, it is necessary to integrate the toluene lost in the distillation with fresh toluene (50 g).

The end of the reaction, on the same lines as example 2, is marked by the passage of pure toluene at the head of the column. A fraction is collected consisting of 62 g of the mixture methanol, toluene, DMC in the relative proportion 65-28.5-6.5% by weight.

At the end of the reaction 470 g of IIIb are recovered in its emulsion in toluene analogously to what is described in example 2.

Neither dioxane nor other by-products can be determined in the distillates.

The product IIIb has the following characteristics:

| colour | light yellow |
|---|---|
| Mn (on basis of N°$_{OH}$) | 1833 |
| N°$_{OH}$ (mg KOH/g) | 61.2 |
| viscosity (Cps, +25° C.) | 5600 |
| unsaturations | <0.0001 |
| tg (DSC; C°) | –75° |
| structure formula: | |

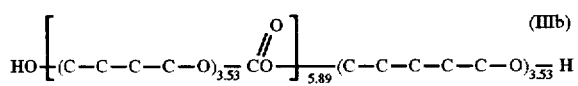
(IIIb)

and a content of $CO_3$ of 19.3% by weight.

EXAMPLE 5

Preparation of MC PEG C (IIc) from diethyleneglycol (DEG).

1200 g (11.32 moles) of DEG (Ia), 1800 g (20 moles) of DMC (DMC/Ia=1.77) and 0.15 ml of NaMet (30% of methanol, 0.0007% by weight as Na$^+$ ion, are concentrated in the same reactor described in example 1.

The transesterification is carried out at a temperature of between 87° and 120° C. and in 12-14 hours first the azeotropic mixture methanol-DMC is collected and, after an intermediate fraction, pure DMC. The three fractions joined together amount to 820 g and were not characterized.

The solution of IIc in DMC, remaining in the boiler, is treated twice successively with bleaching earth (20 g of tonsil earth for each treatment) and subjected to filtration.

1798 g of IIc are recovered from the filtrate following the procedure described for IIa, b in examples 1 and 3.

The product IIc has the following characteristics:

| colour | 15 |
|---|---|
| Mn (on basis of $^1$H and C$^{13}$ nmr) | 499 |
| N°$_{OH}$ (mg KOH/g) | 0.7 |
| viscosity (Cps, +25° C.) | 65 |
| structure formula: | |

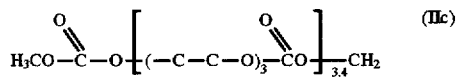
(IIc)

EXAMPLE 6

Preparation of PEG CD (IIIc) from MC PEG C (IIc) and DEG.

300 g (0.601 moles) of IIc, 78.5 g (0.74 moles) of DEG and 15 mg of TIPA (0.008% by weight) are charged into the same reactor as example 1.

The same procedure is adopted as in examples 2 and 4. At the end of the reaction 335 g of product IIIc are recovered from the toluene, which has the following characteristics:

| colour | light yellow |
|---|---|
| Mn (on basis of N°$_{OH}$) | 2018 |
| N°$_{OH}$ (mg KOH/g) | 55.63 |
| viscosity (Cps, +25° C.) | 300,000 |
| unsaturations | <0.0001 |
| tg (DSC; C°) | –24° |
| structure formula: | |

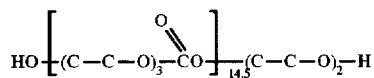

corresponding a content of 43% (weight) of $CO_2$. It was impossible to discover dioxane or similar by-products in the distillate coming from rectification.

EXAMPLE 7

Preparation of MC PEG C (IId) from polypropyleneglycol with Mn 400 (PPG 400).

800 g (2.02 moles) of PPG 400 (N°$_{OH}$ 282.6; Mn 397), 1880 g (21 moles) of DMC and 0.65 ml of NaMet (30% by weight of CH$_3$OH; 0.0032% by weight as Na$^+$ ion), are charged into the reactor of example 1. 296 g of effluent exclusively consisting of methanol and DMC are collected in about 14 hours.

The solution of IId is recirculated in the column filled with tonsil earth, as described in example 1, at 80° C. until total separation of the sodium ion (<1 ppm).

The product IId is isolated from the DMC with a procedure identical to that described in examples 1, 3 and 5.

1037 g of MC PEG C (IId) are recovered with the following characteristics:

| colour | 10 |
|---|---|
| Mn (on basis of $^1$H and C$^{13}$ nmr) | 624 |
| N°$_{OH}$ (mg KOH/g) | 0.49 |
| viscosity (Cps, +25° C.) | 65 |
| structure formula: | |

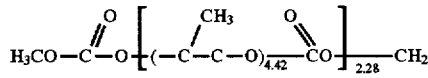

EXAMPLE 8

Preparation of PEG CD (IIId) from MC PEG C (IId) and DEG (Ia).

300 g (0.481 moles) of IId, 70 g (0.66 moles) of DEG, 180 g of toluene, 25 mg of TIPA (0.0017% by weight as Ti ion), are charged into the reactor described in example 1. The molar ratio DEG/IId=1.37.

The rectification operation is carried out at a boiler temperature of 160° C. for a total period of 24 hours until pure toluene is collected.

When the reaction is complete, 483 g of product IIId are recovered from its emulsion in toluene with the following characteristics:

| | |
|---|---|
| colour | light yellow |
| Mn (on basis of $N°_{OH}$) | 1979 |
| $N°_{OH}$ (mg KOH/g) | 56.7 |
| viscosity (Cps, +25° C.) | 2200 |
| unsaturations | 0.0003 |
| tg (DSC; C°) | −55° |
| structure formula: | |

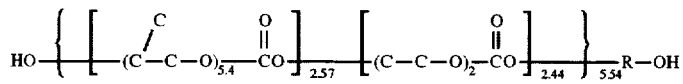

wherein R is the organic radical corresponding to a glycol deriving from the weight average of the MW of the DEG and PPG 400 used in the synthesis. On the basis of the formula the content of $|CO_3|$ is equal to 14% by weight.

EXAMPLE 9
Preparation of MC PEG C (IIe) from propyleneglycol b polyethyleneglycol.

Dipropyleneglycol b polyethyleneglycol obtained by the addition of 3.2 moles of ethylene oxide to dipropylene glycol ($N°_{OH}$ 405.1, Mn 277), represented by the formula:

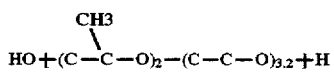

and characterized in that it possesses more than 95% (of the theoretical value) of primary alcoholic groups (350 g, 0.864 moles) is reacted in the same reactor described in example 1 with DMC (776 g, 8.62 moles) in the presence of NaMet (30% of $CH_3OH$, 0.001% by weight as $Na^+$ ion).

The transesterification, at atmospheric pressure, enables the collection of two fractions, the first of which (78 g) consists of the azeotropic mixture methanol DMC (bp 63°–64° C.) and the second (100 g) is an intermediate fraction prevalently consisting of DMC (90% by weight, bp 65°–88°/89° C.).

The solution of IIe is subjected to treatment with tonsil earth as described in example 1 and the compound IIe is recovered from the excess DMC analogously to what is described for the preparation of IIa. The compound IIe (399 g of yield) has the following characteristics:

| | |
|---|---|
| colour (APHA) | 15 |
| Mn (on basis of $^1H$ and $C^{13}$ nmr) | 465 |
| $N°_{OH}$ (mg KOH/g) | 0.35 |
| viscosity (Cps, +25° C.) | 55 |
| structure formula: | |

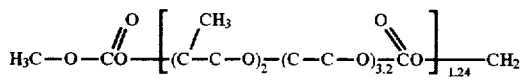

EXAMPLE 10
Preparation of PEG CD (IIIe) from IIe and dipropyleneglycol b polyethyleneglycol.

IIe (300 g, 0.645 moles), dipropyleneglycol b polyethyleneglycol (the same used for the synthesis of IIe, $N°_{OH}$ 405.1, Mn 277; 198 g, 0.175 moles), titaniumtetraisopropoxide (0.1 g) and toluene (90 ml), are charged into the same reactor described in example 1.

The same procedure is adopted as in example 4 integrating, during the rectification, the toluene lost with a further aliquot (80 ml).

At the end of the reaction IIIe is recovered from its emulsion in toluene exactly as described in example 2.

The compound IIIe has the following characteristics:

| | |
|---|---|
| colour | light yellow |
| Mn (on basis of $N°_{OH}$) | 2055 |
| $N°_{OH}$ (mg KOH/g) | 54.6 |
| viscosity (Cps, +25° C.) | 8300 |
| tg (DSC; °C.) | −62 |
| unsaturations | 0.0001 |
| structure formula: | |

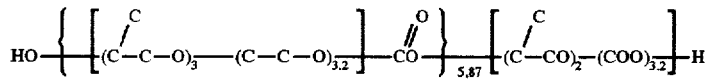

Its content of $[CO_3]$ amounts to 17.1% (weight).

EXAMPLE 11
This examples serves to show how a synthesis process of PEG CD by the direct transesterification of PEG and DMC and extraction of the glycols generally possible at temperatures of between 170° and 230° C. and with a vacuum of less than 5 mm Hg, gives a lower quality PEG CD (worse colour, presence of a higher level of unsaturations and also the production of by-products such as dioxane). In addition, during the process, there is the loss of a certain quantity of methanol and DMC (about 5% of the light effluents) as uncondensable products.

700 g (660 moles) of DEG, 1500 g (7.85 moles) of PEG 200 ($N°_{OH}$ 588.5) and 50 ppm of potassium ion (as KOH), are charged into the reactor described in example 1. The temperature in the reactor is brought to 150°–160° C. and during the reaction 1850 g (20.5 moles) of DMC are eliminated to maintain a vigorous reflux in the column and to keep the temperature constant.

The transesterification proceeds at atmospheric pressure for about 8 hours, during which the azeotropic mixture DMC-methanol is collected. In this time range, the DMC is completely fed into the reactor, whose temperature is brought to 170° and contemporaneously the pressure in the reactor is gradually lowered, in about 2 hours, from atmospheric pressure to 150 mm Hg. During this operation the rectification is carried out and the azeotropic mixture methanol/DMC whose boiling point moves gradually from 62°/63° C. to about 30°-32° C., is collected. The effluents collected (methanol and DMC) amount to 1305 g.

At vacuums of less than 150 mm Hg it is no longer possible to condense the methanol-DMC mixture with a cooler and tap water, and this therefore finishes in the trap as uncondensable product.

When methanol and DMC cannot be collected at the head of the column at 150 mm Hg as they are not able to condense, the rectification column is disconnected and a Liebig cooler and collection flask are put in its place.

The vacuum is progressively lowered to <5 mm Hg and temperatures of between 170° and 180° C. and 61 g of a heavy liquid (bp 80°-103° C. at <5 mm Hg) prevalently consisting of DEG (75%), triethyleneglycol, ethylene carbonate, diethyleneglycol monomethylether and other by-products (25%) are collected with the Leibig apparatus.

The lighter products (methanol, DMC, dioxane) are collected in the protection trap of the vacuum pump as light uncondensable distillate (123 g, 8.4 ml). The dioxane represents 9% by weight of the uncondensable products.

Among the effluents present cyclic carbonate with a large ring (mp 127° C., DSC) is also formed

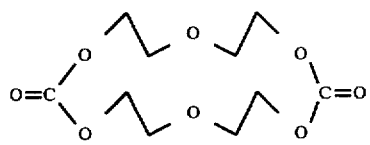

which tends to crystallize from the mixture of DEG and TEG which prevalently forms the heavy distillate.

The PEG CD obtained (2200 g) with a practically identical structure to IIIa has the following characteristics:

| colour | reddish yellow |
|---|---|
| Mn (on basis of N°$_{OH}$) | 1990 |
| N°$_{OH}$ (mg KOH/g) | 56.4 |
| viscosity (Cps, +25° C.) | 15,000 |
| unsaturations | 0.00652 |
| tg (DSC; C.°) | –40° |

EXAMPLE 12

This example serves to show that even when PEG CD are synthesized as in example 11, substituting the alkaline catalyst with an organometallic one such as titaniumtetraalcoholate, the PEG CD are of a lower quality than that of the products claimed in the present invention and, although to a lesser degree, there is the formation of by-products, such as dioxane.

The synthesis of PEG with titanium as catalyst cannot be applied when oligomeric polypropyleneglycols (DPG, TPG, PPG 400, etc.) are present in the starting glycol.

Fresh DEG distillate (2000 g, 18.86 moles) and TIPA (0.1 g) are charged into the reactor described in example 1.

The temperature of the reactor is brought to 165°–170° C. and in the reaction time of 8–10 hours DMC is eliminated (1958 g, 21.76 moles) during which time the azeotropic mixture DMC-methanol is collected, at atmospheric pressure.

The feeding of the DMC is carried out in order to maintain the temperature in the boiler at the indicated level, i.e. 165°–170° C.

The rectification at atmospheric pressure and the subsequent rectifications under reduced pressure, as described in example 9, require an overall time of 14–15 hours at the end of which the azeotropic mixture DMC-methanol is collected (1408 g, bp 62°–30° C., at a pressure varying from 760 to 150 mm Hg).

In these effluents the dioxane is present in the proportion of 0.075% by weight.

At this point as in the case of example 9, the column is disconnected and substituted with a Liebig cooler; vacuum is gradually applied until there is a residual pressure varying from 5 to 1 mm Hg, and the heavy distillate is collected (186 g), 87% by weight of which consists of DEG and the remaining amount of by-product. This phase has a duration of about 4 hours. The uncondensable products in the trap (65 g) prevalently consisting of methanol and DMC, also contain dioxane (2.5%), showing that even by limiting the reaction temperature to the minimum possible (170° C.) and using an organometallic catalyst at the lowest level of concentration (8 ppm as Ti ion), it is not possible to avoid by-products.

The PEG CD thus obtained has a structure which practically coincides with IIIc with the following characteristics:

| colour | golden yellow |
|---|---|
| Mn (on basis of N°$_{OH}$) | 1960 |
| N°$_{OH}$ (mg KOH/g) | 57.25 |
| viscosity (Cps, +25° C.) | 290,000 |
| unsaturations | 0.0012 |
| tg (DSC; C.°) | –40° C. |

I claim:

1. A process for the preparation of a polycarbonate copolyether diol (PEG CD) having formula (I):

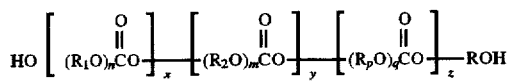

wherein $R_1$, $R_2$, ... $R_p$ are the same or different and are divalent organic radicals and correspond to the following structures:

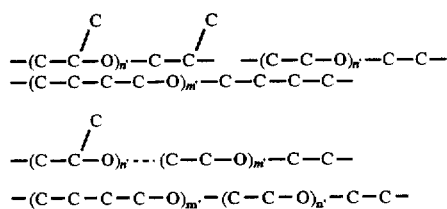

wherein n' and m' are whole or fractional numbers between 1 and 10; n, m and q can have any value between 1 and 10; x, y and z either individually or as a sum can have any value between 1 and 40, said process comprises:

preparing in a first reaction stage, a precursor bisdimethylcarbonate of polyetherglycol polycarbonate (MC PEG C) having the formula:

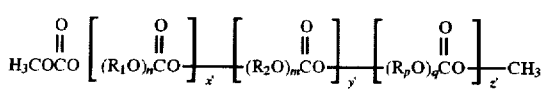

wherein $R_1, R_2 \ldots R_p$, are the same or different, and are divalent organic radicals and have the meaning previously defined; x', y' ... z', alone or as a sum, can have any value between 1 and 10, by reacting, in a reactor equipped with a distillation column, one or more polyetherglycols (PEG) having the formula:

HO—R'—OH wherein R' is a divalent organic radical corresponding to one of the following structures:

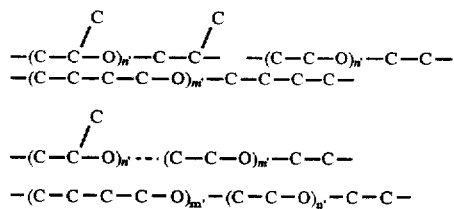

wherein m' and n' have the meaning defined above, with dimethyl carbonate (DMC), at a temperature of between 90° and 120° C., in a molar ratio DMC/PEG of between 2 and 12 and in the presence of a basic catalyst selected from the group consisting of an oxide, a hydroxide, a carbonate and an alcoholate of a metal belonging to the group of alkaline or earth-alkaline metals, at a concentration of between 0.001 and 0.1% by weight, converting in a second reaction stage said precursor, bismethylcarbonate of polyetherglycol polycarbonate (MC PEG C), after having freed from the catalyst and excess dimethyl carbonate (DMC), to a polycarbonate copolyether diol by a transesterification reaction with polyetherglycol (PEG), having formula HO—R"OH, wherein R" is one of the following structures:

—(C—C—O$_n$)—C—C—, —(C—C—C—C—O)$_m$—C—C—C—, or a mixture thereof, in a reactor equipped with a distillation column, at a temperature of between 140° and 185° C., at atmospheric pressure, in a ratio between bisdimethylcarbonate of polyetherglycol polycarbonate (MC PEG C) and polyetherglycols (PEG) of between 0.8 and 2, in the presence of a solvent and an organometallic catalyst selected from the group consisting of compounds of tin, lead, titanium, zirconium and antimonium at a concentration of between 0.0001–0.0010% by weight.

2. The process according to claim 1, characterized in that sodium methylate is used as catalyst of the reaction of the first stage at a concentration of between 0.001 and 0.1%.

3. The process according to claim 1 or 2, characterized in that in the reaction of the first stage polyetherglycols are reacted, selected from the group consisting of: diethyleneglycol (DEG), triethyleneglycol (TEG), tetraethyleneglycol (EG4), polyethyleneglycol Mn 200 (PEG 200), dipropyleneglycol (DPG, mixture of isomers), tripropyleneglycol (TPG, mixture of isomers), polypropyleneglcyol Mn 400 (PPG 400), polypropyleneglycol Mn 450 (PPG 450), polypropyleneglycol Mn 650 (PPG 650), polytetrahydrofuran Mn 250 (PTMEG 250), polytetrahydrofuran Mn 600 (PTMEG 600), dipropyleneglycol polyethyleneglycol Mn 250 (DPG bEO 250).

4. The process according to claim 1, characterized in that the reaction of the second stage takes place at a temperature of between 150°–155° C.

5. The process according to claim 1, characterized in that the reaction of the second stage takes place in the presence of toluene, cyclohexane or benzene as solvent.

6. The process according to claim 1, characterized in that the reaction of the second stage takes place in the presence of a catalyst consisting of organometallic compounds of titanium or tin.

7. The process according to claim 6, characterized in that the catalyst is titanium tetraisopropylate or titanium tetrabutoxide, at a concentration of between 0.0005–0.001% by weight as $Ti^{+4}$ ion.

8. The process according to claim 1, characterized in that the precursor, bisdimethylcarbonate of polyether diols (MC PEG C), is freed from the catalyst by treatment with bleaching earth at a temperature of between 20° and 90° C. or treatment with other chemical absorbents, and from the dimethylcarbonate by distillation under vacuum at 20–50 mm Hg and at a temperature of 120°–140° C.

9. The process according to claim 1, characterized in that the polycarbonate polyether diols obtained in the second reaction stage are recovered from the reaction mixture by removing the solvent by distillation at reduced pressure.

10. Bisdimethylcarbonate of polyetherglycol polycarbonates (MC PEG C) obtainable by the process of claim 1.

11. Polycarbonate polyether diols having formula (I) characterized by a molecular weight of between 500 and 6000, colouring <250 APHA and hydroxylic functionality >97% with respect to the theoretical value, which can be obtained according to the process of claim 1.

* * * * *